May 5, 1970   B. ZAHAYKEVICH   3,510,628
HOUSING HAVING INSULATING STRAIN RELIEF GROMMET THERETHROUGH
Filed Feb. 21, 1967

INVENTOR.
BOHDAN ZAHAYKEVICH

BY Richard M. Rabkin

ATTORNEY

3,510,628
Patented May 5, 1970

3,510,628
HOUSING HAVING INSULATING STRAIN RELIEF GROMMET THERETHROUGH
Bohdan Zahaykevich, Newark, N.J., assignor to Federal Pacific Electric Company, a corporation of Delaware
Filed Feb. 21, 1967, Ser. No. 617,560
Int. Cl. H05b *1/00*
U.S. Cl. 219—366                                     11 Claims

ABSTRACT OF THE DISCLOSURE

An insulating strain relief grommet of semi-rigid thermo-plastic material is locked in place, and simultaneously locks conductors passing through the grommet, by deformation of the edge of the wall of the housing in which the grommet is seated.

This invention relates to insulating strain relief grommets and more particularly to a grommet which is locked in place by the deformation of the mounting panel.

This invention is applicable to many electrical devices but has been found to be particularly valuable in connection with devices or apparatus for electric space heating particularly in electric baseboard heaters. Electric baseboard heaters include a resistance element and a finned radiator structure. The heating element is mounted in one compartment of the heater enclosure and an adjacent compartment is used as a junction box. In accordance with the various electrical codes these compartments are isolated by a partition wall. The connecting wires pass through the partition wall from the junction box compartment to the heating element compartment. This leads to problems of abrasion of the insulation on the edges of the pass-through opening in the partition wall. Movement of the wire occurred during use of the heater due to movement of terminal end of the heating element as it is heated up and as it cools off. Additionally, the end of the connecting wire in the junction box is used by the installer for connecting the heating element to the power circuit. It was found that failures of certain heaters could be attributed to the strain placed on the wire during the making of the connection. Further, during the process of the wire during the making of the connection. Further, during the process of assembling the heaters it was possible to damage the insulation due to adjustment of the position of the wires.

It is necessary to dress the wires, i.e., to shape the wires into a loop to provide for the relative movement of the wires due to the expansion and contraction of the heating element. Prior to the grommet described below, two types of grommets were used. In one type the wires were threaded through the grommet and once the grommet was in position in the partition wall the wires were locked in position thus complicating the dressing of the wires. In another type of grommet where the wires were loose in the grommet, separate secondary wire locking devices were used to fix the wires in position.

It is an object of this invention to provide an improved grommet for use in electrical devices, which is easily positioned in the housing wall, either with or without the wires in place and which is locked in place and simultaneously locks the wires.

Another object of this invention is the provision of an axially symmetrical insulating grommet which allows relative movement of the conductors passing therethrough until the grommet is secured in position.

Still another object of the invention is the provision of a grommet of semi-rigid thermoplastic material having improved means for separating and spacing the locked conductors.

Yet another object of this invention is the provision of a symmetrical grommet having improved wire retention characteristics.

The above and other objects, advantages and novel features of the invention are accomplished by the illustrative embodiment of the invention described in detail below. This embodiment will be best understood from a study of the following description taken in conjunction with the accompanying drawing in which.

Briefly, the illustrated embodiment of the invention includes a flexible, unitary, axially symmetrical grommet which is secured to a housing by engagement in a notch opening to the edge of a wall of the housing. A closed-ended slot is formed in the wall adjacent the notch. The portion of the wall remaining between the slot and the notch may be deformed to lock the grommet in the notch and, simultaneously, lock wires passing through the grommet in position. Prior to the deformation of the wall portion the conductors may be positioned in the grommet while the grommet is retained in position by its engagement with the wall.

Figure 1:
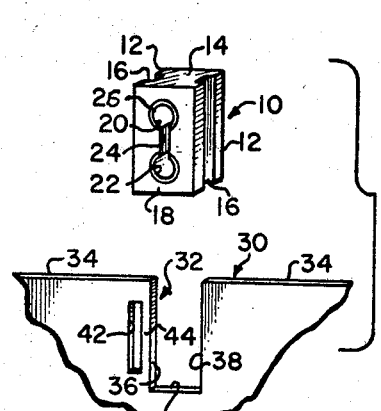
FIG. 1 is a perspective view of the grommet and a portion of the housing wall adapted to receive the grommet.
Figure 2:
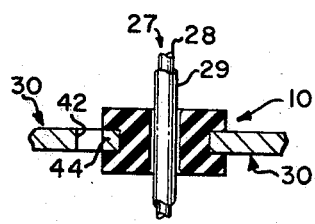
FIG. 2 is a cross-sectional view of the grommet in position in the wall prior to the locking of the grommet in position.
Figure 3:
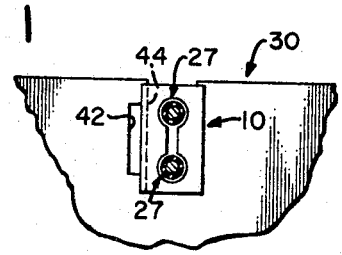
FIG. 3 is a front view of the grommet in position in the housing wall, similar to FIG. 2.

Referring to the drawings the grommet 10, of semi-rigid thermoplastic electrical insulation material, such as nylon, has a generally rectangular configuration, being bounded by opposed lateral faces 12 and end faces 14. The lateral faces 12 are provided with peripheral grooves 16 which extend the full length of the faces. The broad faces 18 of the grommet lie in substantially parallel planes and extend between the lateral faces 12 and end faces 14. Only one broad face 18 is visible in FIG. 1. A pair of conductor receiving passageways 20, 22 are provided in the body of the grommet. The pasageways 20, 22 are arranged along the medial line of the grommet, and in the illustrated embodiment their centers are spaced from each of the end faces 14 one quarter of the length of the lateral faces 12. The passageways are interconnected by a through slot 24. The length of the slot, measured from the centers of the passageways, is approximately one-half the length of the lateral faces 12. The openings 20, 22 have chamfered guide surfaces 26 for assisting in the insertion of the conductors 28.

The partition or housing wall 30, of metal, has a notch 32 which opens to the edge 34 of the wall. The notch is defined by parallel edges 36, 38 that are connected by a bottom edge 40. A close-ended slot 42 is provided adjacent one edge 36 of the notch 32 and defines a wall portion 44. The wall portion 44 is a lock for the grommet and is deformable, as will be explained in detail below, to lock the grommet in the notch.

The wire 27 comprises an electric conductor 28 with a layer of heat resistant electrical insulation 29. The openings or conductor receiving passageways 20, 22 are relatively sized to readily accept the wire in the unlocked condition of the grommet and to securely engage the wire in the locked condition. Slot 24 in the grommet body is provided to allow relative constriction or change in dimension of the passageways 20, 22 to allow them to grip the conductors.

Figure 5:
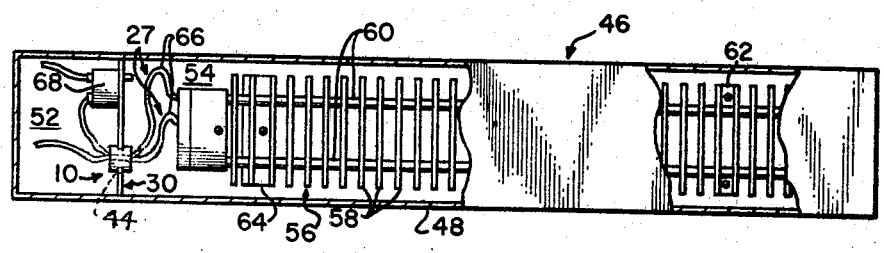
FIG. 5 is a front view of an electric baseboard heater, on a greatly reduced scale, with the cover removed showing an application of the grommet to an electric space heater.

Referring to FIG. 5, a typical form of electric baseboard heater 46 is illustrated. The heater 46 includes a metallic enclosure 48 and an interior wall or partition 30 which divides the enclosure into a wiring compartment 52 and a heating element compartment 54. A heating element 56, of well-known construction, is mounted in the heating element compartment. Generally such heating elements comprise a plurality of heat radiating fins 58 which are secured to one or more tubes 60 containing the electrically energized heating element (not shown). The heating element 56 is a substantially rigid structure. It is mounted within the compartment 54 by a fixed bracket 62 which is clamped to the tubes 60 adjacent the end of the element remote from the wiring compartment. The other end of the heating element, adjacent the wiring compartment 52, is carried by a bracket 64 that is slidably mounted on the rear wall of the enclosure 48 to allow expansion and contraction of the heating element as it cycles. Lead wires 27 are connected to the heating element within the tubes 60 and are formed into loops 66 to allow for the movement of the heating element. The loops allow the wire 27 to flex and reduce the possibility of breakage. The wires 27 pass through the interior wall 30, through the grommet 10, for connection to the wires (not shown) leading to the source of power. In the illustrated heater, one of the wires 27 is connected to one terminal of a two terminal over-temperature sensing safety device 68 and the other wire 27 is free. The power leads are connected to the free wire and to the other terminal of the safety device.

Figure 4:
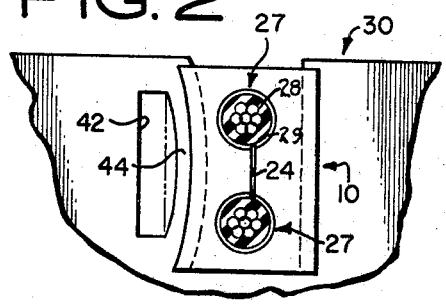
FIG. 4 is a front view similar to FIG. 3 in which the grommet and the wire have been secured in position by deformation of the housing wall.

In assembling the electric baseboard heater the heating element 56 with the lead wires 27 connected thereto is mounted in the enclosure 46 on the brackets 62, 64. The wires 27 are threaded through the openings 20, 22 in the grommet 10 which is then slid into the notch 32. It will be noted that the relatively close fit of the opposed wall edges 36, 38 in the bottoms of the grooves 16 assures the retention of the grommet in the notch. The loops 66 are formed in the lead wires. The wires 27 are slidable within the grommet which is held in place by its engagement with the wall. Once the desired lead dress is obtained a tool, such as a screw driver blade, is inserted into the slot 42 and by a twisting operation the assembler is able to deform the wall portion 44 substantially within the plane of the wall. The deformation of the wall portion squeezes the semi-rigid thermoplastic material to securely grip the wires 27. The amount of closure of the openings is limited by the width of the slot 24, thus protecting the insulation coating 29 on the wires from being crushed. The opposed portions of the body which define the slot are in engagement in the limiting condition. As illustrated in FIG. 4 the slot is substantially equal, in length, to the distance between the center lines of the wires 27. Therefore, when the wall portion 44 is deformed the width of the grommet body in a plane parallel to the end faces 14 is made smaller than the width of the end face 14 thereby locking the grommet against movement.

The aforedescribed construction provides an improved means for securing, in an insulated manner, wires which pass through a housing wall. Further, the lead dress within the housing is protected against disturbance, when the enclosed unit is being connected.

While only one embodiment of the invention has been shown and described in detail it will be obvious to those skilled in the art that various changes and modifications may be made therein without departing from the spirit and scope of the invention.

What is claimed is:

1. A flexible unitary axially symmetrical grommet secured to a housing including a wall by engagement with a notch opening to the edge of a wall of the housing, a portion of said wall being deformed substantially within the plane of said wall, said deformed portion being adjacent one side of said notch, said grommet comprising a generally rectangular body of semi-rigid insulation material, said body engaging the peripheral portions of said wall at said notch, means defining a conductor receiving passage of a given dimension through said body of said grommet, said deformed portion of said wall being selectively displaced toward said grommet and distorting said grommet to thereby change said given dimension of said conductor receiving passage to restrain a conductor in said passage.

2. The invention according to claim 1 wherein said deformed portion of said wall is defined by a slot in said housing wall and the adjacent peripheral portion of said wall defining one side of said notch.

3. The invention according to claim 2 wherein said body of said grommet has opposed lateral faces, said lateral faces having a peripheral groove formed therein in engagement with said wall.

4. The invention according to claim 1 wherein said grommet has a pair of conductor receiving passages therethrough, said passages being separated from one another but contiguous, said deformed portion of said wall engaging said body intermediate said passages whereby said displacement thereof changes the given dimension of both of said passages to restrain conductors in said passages.

5. The invention according to claim 4 wherein said conductor receiving passages are interconnected by a slot through said body of said grommet, said slot being defined by opposed portions of said body, said opposed portions limiting the amount of change in the given dimension of said passages when said deformable wall portion is displaced.

6. A flexible, unitary axially symmetrical grommet secured to a housing including a wall by engagement with a notch opening to the edge of said wall of said housing, said wall having a closed-ended slot formed therein adjacent said notch, a deformed portion of said wall being defined by said notch and said adjacent slot, said grommet comprising a generally rectangular body of semi-rigid insulation material, said body having opposed lateral faces and end faces, said lateral faces having peripheral grooves formed therein in engagement with said wall, means defining a conductor receiving passage of a given dimension through said body of said grommet, said deformed portion of said wall being displaced toward said grommet substantially in the plane of said wall and distorting said grommet to thereby change said given dimension of said conductor receiving passage to restrain a conductor in said passage.

7. In an electric baseboard heater including an enclosure, an interior wall dividing said enclosure into a wiring compartment and a heating element compartment, a heating element in said compartment connectable to a source of power, said element expanding when heated and contracting when de-energized thereafter, at least a pair of conductors extending from said wiring compartment through an aperture in said interior wall into said heating compartment, the improvement comprising a deformable grommet in interlocking engagement with the edges of said wall defining said aperture, a portion of said wall being deformed to force said grommet into engagement with said conductors whereby said grommet is locked in said wall and said conductors are restrained against movement therethrough.

8. A flexible unitary axially symmetrical grommet secured to a housing including a wall by engagement in an opening in a wall of said housing, a portion of said wall being deformed substantially within the plane of said wall, said deformed portion being adjacent one side of said opening, said grommet comprising a body of deformable insulation material, said body engaging the peripheral portions of said wall at said opening, means defining a conductor receiving passage of a given dimension through said body of said grommet prior to being secured to said housing, said deformed portion of said wall being displaced toward said grommet and distorting said grommet to thereby change said given dimension of said conductor receiving passage to restrain a conductor in said passage.

9. The invention according to claim 8 wherein said deformed portion of said wall is defined by a slot in said housing wall and the adjacent peripheral portion of said wall defining one side of said opening.

10. The invention according to claim 9 wherein said body of said grommet has a peripheral face, said face having a groove formed therein in engagement with said wall.

11. In an electrical device including an enclosure, said enclosure including a wall, electrical apparatus in said enclosure connectable to a source of power, at least a pair of conductors extending from said enclosure through an aperture in said wall into said enclosure, the improvement comprising a deformable grommet in interlocking engagement with the edges of said wall defining said aperture, a portion of said wall being deformed adjacent said grommet to force said grommet into engagement with said conductors whereby said grommet is locked in said wall and said conductors are restrained against movement therethrough.

References Cited

UNITED STATES PATENTS

| | | | |
|---|---|---|---|
| 2,586,696 | 2/1952 | Nauth | 339—126 |
| 2,411,128 | 11/1946 | Carlson. | |
| 2,427,742 | 9/1947 | Peterson. | |
| 2,856,500 | 10/1958 | Hartman | 219—342 XR |
| 2,882,381 | 4/1959 | Zellers | 219—345 XR |
| 2,922,836 | 1/1960 | Brown. | |
| 3,191,135 | 6/1965 | Hazelquist | 336—65 |

FOREIGN PATENTS

| | | |
|---|---|---|
| 905,557 | 9/1962 | Great Britain. |
| 420,810 | 5/1947 | Italy. |
| 476,736 | 12/1952 | Italy. |

LARAMIE E. ASKIN, Primary Examiner

U.S. Cl. X.R.

219—342; 174—65, 153